No. 793,341.    Patented June 27, 1905.

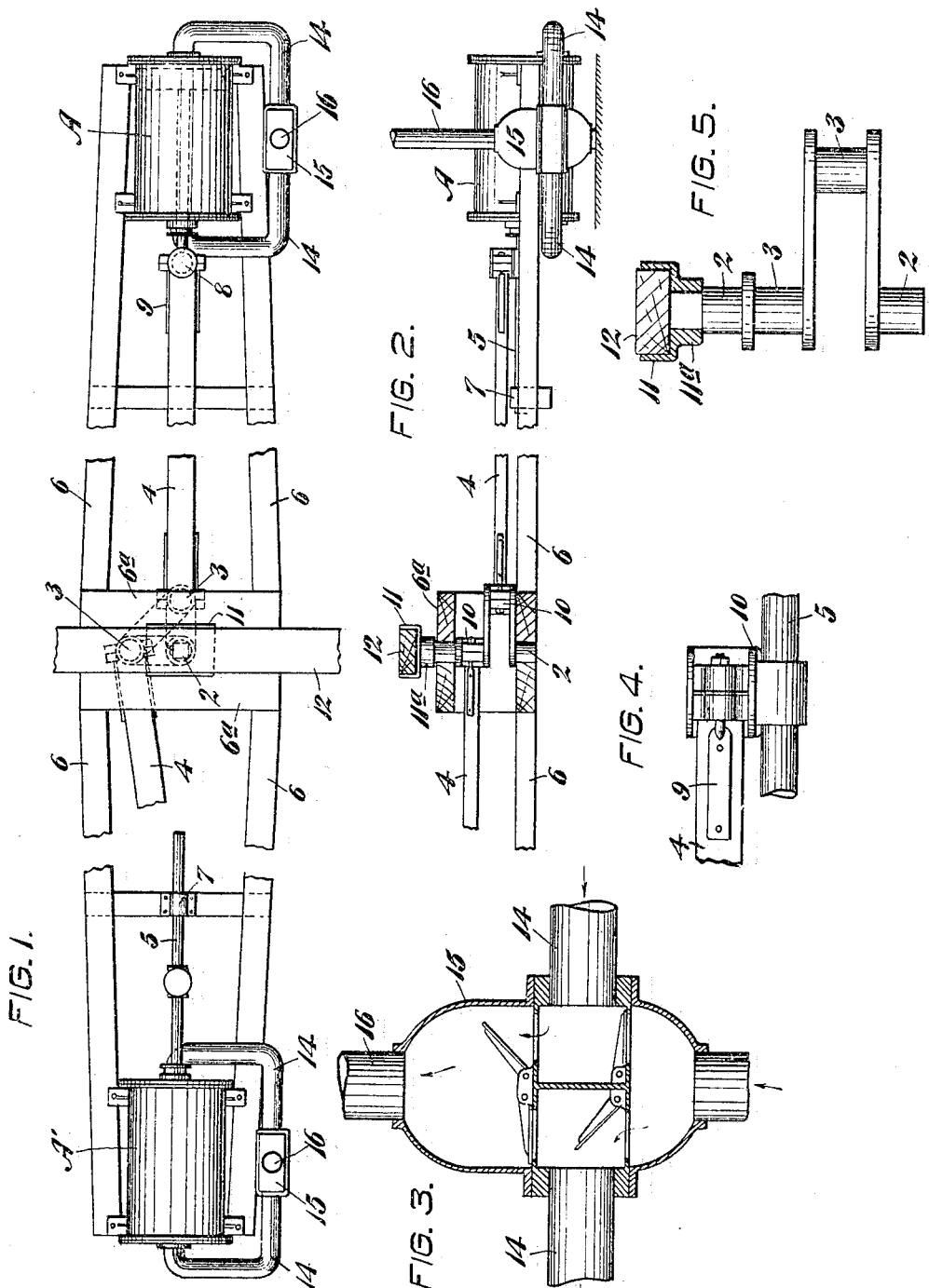

UNITED STATES PATENT OFFICE.

WILLIAM W. BELKNAP, OF STOCKTON, CALIFORNIA.

PUMPING APPARATUS.

SPECIFICATION forming part of Letters Patent No. 793,341, dated June 27, 1905.

Application filed January 10, 1905. Serial No. 240,427.

*To all whom it may concern:*

Be it known that I, WILLIAM W. BELKNAP, a citizen of the United States, residing at Stockton, in the county of San Joaquin and State of California, have invented new and useful Improvements in Pumping Apparatus, of which the following is a specification.

My invention relates to a pumping apparatus which is especially designed for raising quantities of water to a comparatively low elevation and a means for connecting a horsepower with such an apparatus, so that the power may be applied in a substantially equalized manner to produce a continuous flow of water.

The invention consists in combinations of parts and details of construction, which will be more fully explained by reference to the accompanying drawings, in which—

Figure 1 is a plan view of my pump. Fig. 2 is a side elevation of one-half of same, partly in section. Fig. 3 is a section through valve-chamber. Fig. 4 is a view of connection for piston-rod. Fig. 5 is a view of crank-shaft.

As shown in the accompanying drawings, A and A' are two pumping-cylinders located at opposite sides of a vertically-journaled shaft 2, which shaft is provided with double cranks at substantially right angles with each other, as shown at 3. The distance between the cylinders and this crank-shaft is sufficient to allow suitable pitmen 4 to connect the cranks with the respective piston-rods 5 of the cylinders.

The whole apparatus is supported upon a suitable framework of timbers, as shown at 6, and upon the cross-timbers, located near the cylinders, are fixed guides, as at 7, through which the piston-rods are slidable, thus keeping them in proper alinement.

The pitmen 4 extend just above the line of the piston-rods and have at their ends boxes 8, which are connected with the pitmen by straps, as at 9, and these boxes fit upon wrist-pins 10, which are secured to the piston-rods 5, so that by the revolutions of the crank-shaft motion is communicated to reciprocate the pistons. The crank-shaft is formed, as shown, either cast or otherwise and has the journals (shown at 2) which are turnable in boxes supported by timbers, as at $6^a$, which timbers extend across between the longitudinal timbers 6 above and below the cranks, and thus form a sufficient support for the vertical crank-shaft. The boxes 10, which connect the pitmen with the cranks, are formed similarly to those shown at 8 upon the opposite ends of the pitmen.

In order to transmit motion to the crank-shaft and thence to the pistons, I have shown a clamp or socket 11, which is adapted to receive the end of the sweep 12, to which the animals are to be attached to provide power. This clamp or socket is formed with an extension or hub, as at $11^a$, and preferably with a square hole made through it, which fits upon a correspondingly square portion of the upper end of the shaft. The sweep being fixed in this socket-piece, it will be seen that power applied by attaching the animals to the long arm of the sweep and driving them in a circle will serve to transmit power to rotate the vertical shaft and through the cranks and pitmen to reciprocate the plungers of the pumps. As these cranks are set at an angle with each other, as shown, it will be manifest that while one is passing the center and requiring but little power the other one will be at the middle of its stroke and requiring the maximum power. The opposite reciprocations of the pistons will produce a substantially constant stream from the pump.

Each pump has connected with its opposite ends pipes, as at 14, and these pipes connect with a common valve-chamber 15, which is shown as standing at one side and substantially opposite the center of the cylinder. This valve-chamber is composed of an upper, middle, and lower section. The upper and the lower sections may be open throughout. The middle section has a vertical transverse partition dividing it into two parts. The pipe 14 from one end of the cylinders connects with one of these parts and the pipe from the opposite end with the other part.

The top of the lower section of the valve-chamber carries the inlet-valves, one opening into the chamber at each side of the vertical diaphragm, and the top of the middle section in the same manner carries the outletvalves, so that the reciprocations of the pump will alternately draw water through the middle chamber upon opposite sides of the diaphragm and eject it into the upper portion of the valve-chamber, from which it is conveyed by a pipe, as at 16. The pipe 16 from the two pump-cylinders may either unite to a common delivery or may discharge independently, if desired.

By this construction I am enabled to produce a cheap and effective apparatus by which water may be raised for irrigating and like purposes in large quantities and at a minimum of expense.

The cylinders are cast without ports, the independent valve-chambers with detachable sections, and pipes connecting the valve-chambers with the cylinder-heads, and I am thus enabled to dispense with ports cast within the cylinders.

Having thus described my invention, what I claim, and desire to secure by Letters Patent, is—

1. The combination of a unitary frame, horizontally-disposed pump-cylinders at opposite ends thereof and substantially axially in line, a valve-chamber for, and at one side of, each cylinder and pipes connecting the chamber with opposite ends of the cylinder, said chamber including a plurality of sections with an intermediate section divided into two compartments to each of which one of the said pipes connects, and valves controlling the intermediate chambers with those above and below the same, a support extending transversely across the frame essentially midway between the cylinders, a crank-shaft journaled in said support, pitmen extending from the cranks of the shaft and piston-rods connected to the pitmen, said crank-shaft having a socket member fixed to its upper end, and a sweep having its inner end fixed to the socket member.

2. The combination of a unitary frame, horizontally-disposed pump-cylinders at opposite ends thereof and substantially axially in line, a valve-chamber for, and at one side of, each cylinder and pipes connecting the chamber with opposite ends of the cylinder, said chamber including a plurality of sections with an intermediate section divided into two compartments to each of which one of the said pipes connects, and valves controlling the intermediate chambers with those above and below the same, a support extending across the frame at a point essentially midway between the cylinders, a vertical shaft journaled in said support and provided with cranks, a socket member fixed to the upper end of the shaft and a sweep fixed to said socket member, pitmen extending from the cranks, pistons operable in the cylinders and provided with rods, boxes at the outer end of the pitmen and means connecting the boxes to the pitmen, and wrist-pins on the piston-rods fitting said boxes.

3. The combination of horizontally-disposed pump-cylinders, a compartment valve-chamber for each cylinder located at one side thereof and pipes connecting the separate compartments of the chamber with opposite ends of the cylinder, a supporting-frame, a vertical crank-shaft located on the frame essentially midway between the cylinders, pistons operable in the cylinders and provided with rods, pitmen connecting said rods with the cranks of the shaft, a socket at the upper end of the shaft said socket having an extension or hub portion adapted to receive the upper end of the shaft and having its opposite portion adapted to receive the sweep.

4. In a pumping apparatus, opposed cylinders in line, an intermediate mechanism transmitting power to the pistons of both cylinders, valve-chambers with three detachable superposed sections located exterior to and independent of the pump-cylinders, pipes connecting the central sections with the cylinder-heads, inlet-pipes to the lower sections and outlet-pipes from the upper sections.

In testimony whereof I have hereunto set my hand in presence of two subscribing witnesses.

WILLIAM W. BELKNAP.

Witnesses:
 ELIHU B. STOWE,
 NONIE BURKE.